United States Patent [19]

Müller

[11] Patent Number: 4,953,876
[45] Date of Patent: Sep. 4, 1990

[54] SEALING RING STRUCTURE

[75] Inventor: Heinz K. Müller, Waiblingen, Fed. Rep. of Germany

[73] Assignee: Busak & Luyken GmbH & Co., Stuttgart, Fed. Rep. of Germany

[21] Appl. No.: 272,193

[22] Filed: Nov. 16, 1988

[30] Foreign Application Priority Data

Nov. 17, 1987 [DE] Fed. Rep. of Germany ....... 3738988

[51] Int. Cl.⁵ .................... F16J 15/24; F16J 15/32; F16J 15/56
[52] U.S. Cl. .................... 277/165; 277/176; 277/177; 277/201
[58] Field of Search ............... 277/165, 213, 176, 177, 277/201

[56] References Cited

U.S. PATENT DOCUMENTS

| | | | |
|---|---|---|---|
| 2,631,907 | 3/1953 | Johnson, Jr. | 277/165 V |
| 4,614,348 | 9/1986 | Fournier | 227/188 A |
| 4,681,327 | 7/1987 | d'Agostino et al. | 277/165 V |
| 4,702,482 | 10/1987 | Oseman | 277/165 |
| 4,709,932 | 12/1987 | Edlund et al. | 277/165 |
| 4,714,259 | 12/1987 | Macket et al. | 277/165 |
| 4,723,782 | 2/1988 | Muller | 277/165 V |

FOREIGN PATENT DOCUMENTS 1742250  1/1957  Fed. Rep. of Germany .
2351767  10/1973  Fed. Rep. of Germany .

*Primary Examiner*—Allan N. Shoap
*Attorney, Agent, or Firm*—Cohn, Powell & Hind

[57] ABSTRACT

A sealing ring structure comprises a sealing ring provided with sealing edges which are arranged adjacent its ends and are in contact with a second machine part, and a stressing ring embracing the sealing ring, loading it in the radial direction and being fitted into an annular recess in the sealing ring. The tightness of such a structure at high fluid pressures is improved by the fact that the stressing ring is accommodated in a trapezoidal annular groove in the sealing ring which communicates with the space between the sealing edges by radial bores. The stressing ring, which is fixed in the groove of the sealing ring, is shifted in operation in response to the prevailing pressures whereby the sealing edge on the high-pressure side is relieved from pressure while the contact pressure exerted upon the sealing edge on the low-pressure side is simultaneously increased. The pressure fluid is thereby permitted to escape from the space between the two sealing edges, at the pressure-relieved sealing edge on the high-pressure side and/or through the radial bores, and any leakage caused by the sealing ring being lifted is safely prevented, even in the presence of very high pressures.

4 Claims, 1 Drawing Sheet

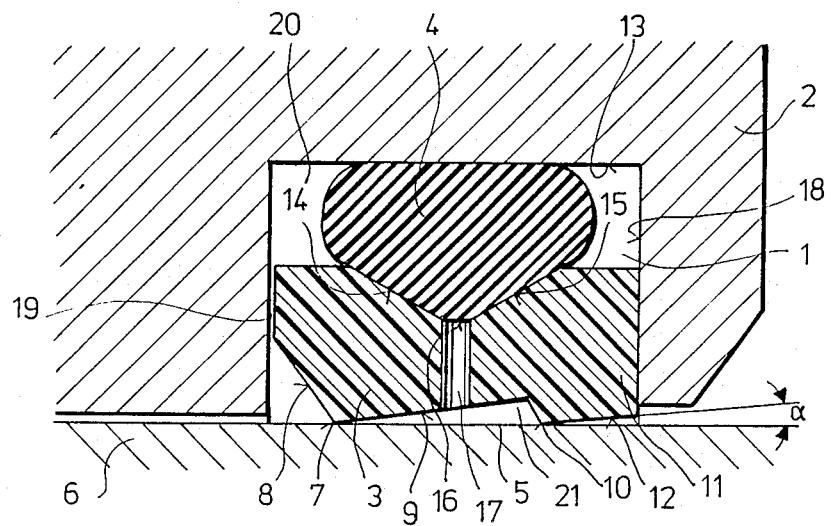

SEALING RING STRUCTURE

BACKGROUND OF THE INVENTION

The present invention relates to a structure for sealing the gap between two concentric machine parts which are arranged for linear movement relative to each other, the first machine part being provided with a groove while the second one comprises a plain contact surface arranged opposite the said groove, the sealing ring structure comprising a sealing ring made of a tough-elastic plastic material fitted into the groove and being provided with sealing edges which are arranged adjacent its ends on its first circumferential surface facing the said contact surface and by which it bears against the contact surface of the second machine part, and being further provided with an annular recess arranged in its second circumferential surface facing the bottom of the groove, the sealing ring structure comprising further a stressing ring made of a rubber-elastic material arranged between the said sealing ring and the bottom of the groove, in the recess provided in the second circumferential surface of the sealing ring, the axial extension of the said stressing ring being smaller than that of the sealing ring.

A sealing ring structure of this type has been known from DE-OS No. 36 03 669 in the form of a double wiper arrangement. In the case of this known arrangement, the recess for accommodating the stressing ring is provided at the low-pressure end of the sealing ring and forms sort of a step which is open towards the low-pressure end face of the sealing ring. Accordingly, the stressing ring is retained not only between the bottom of the groove and the second circumferential surface of the sealing ring facing the bottom of the groove, but also between the flank of the groove on the low-pressure end and the flank of the recess facing it at a certain spacing. Under normal operating conditions, the sealing ring is, therefore, retained in contact with the flank of the groove on the high-pressure end, opposite the stressing ring. Further, it is ensured by the particular arrangement that the maximum of the contact pressure of the stressing ring is exerted upon the sealing edge on the low-pressure end.

It has been found in the case of such double wiper arrangements, which simultaneously perform the function of a seal, that increasing pressure on the fluid to be sealed off leads to an increasing leakage rate so that the known arrangement is in any case not suited for use as the sole sealing and wiping element when the fluid to be sealed off is highly pressurized. In such cases, additional sealing elements have to be provided upstream of the described arrangement.

SUMMARY OF THE INVENTION

Now, it is the object of the present invention to improve an arrangement of the type described above in such a manner that perfect sealing is ensured even under extremely high fluid pressures.

This object is achieved according to the invention by the fact that the recess is provided in the area between the two sealing edges of the sealing ring, that its dimensions are selected so that its width decreases as its depth rises, and that the stressing ring engaging the recess is free to shift towards the low-pressure end of the arrangement.

Very careful measurements have shown that the phenomenon of the known arrangement, namely that the leakage rate rises under high pressure, is due to the fact that a very high drag pressure builds up in the fluid carried into the space between the two sealing edges, which finally exceeds the working pressure of the fluid upstream of the seal, with the consequence that the sealing edge of the sealing ring on the low-pressure end is lifted off its opposite contact surface so that the fluid which had been carried into the space between the two sealing edges is permitted to escape from this space towards the low-pressure end. The drag pressure existing in the space defined by the two sealing edges develops in direct proportion to the fluid pressure so that the pressure difference between the drag pressure and the fluid pressure rises proportionally to the fluid pressure, whereas the surface pressure exerted upon the sealing edge at the low-pressure end exceeds the value determined by the fluid pressure only by the substantially constant amount resulting from the compression of the stressing ring so that when the pressure rises, the relieving effect of the rising drag pressure on the sealing edge on the low-pressure side may finally exceed the loading effect of the stressing ring, so that finally the before-mentioned leakage may occur. In addition, under high pressure the sealing ring tends to shift towards the flank of the groove on the low-pressure end, which leads to a certain increase of the pressing force exerted by the stressing ring upon the sealing edge of the high-pressure side and to a corresponding reduction of the pressing force exerted upon the sealing edge on the low-pressure side, and this also contributes towards increasing the drag pressure in the space between the two sealing edges, and furthers the resulting leakage.

In the case of the arangement according to the invention, in contrast, the increasing fluid pressure will cause the sealing ring arranged between the two sealing edges to shift towards the sealing edge on the low-pressure side so that as the fluid pressure rises, the stressing force exerted by the stressing ring will be shifted more and more towards the sealing edge on the low-pressure side and, accordingly, the action of the stressing ring on this sealing edge increases as the fluid pressure rises, while the sealing edge on the high-pressure side is simultaneously relieved. Consequently, the drag pressure existing in the space between the two sealing edges, which is determined by the pressing force of the sealing edge on the high-pressure side, will not rise in proportion to the fluid pressure. In this connection, it is regarded as a particular advantage that the invention provides the possibility to adapt the increase or reduction of the pressing force of the stressing ring exerted upon the sealing edges on the low-pressure or the high-pressure sides, which is a function of the fluid pressure, to suit optimally the particular application, by giving the recess accommodating the stressing ring a convenient design. In any case, however, it is rendered possible by the invention to design the sealing ring structure in such a manner that the pressing force exerted upon the sealing edge on the low-pressure side will always be higher than the counter force exerted by the fluid carried into the space between the two sealing edges, at all pressures of the fluid to be sealed off that can be expected in normal operation, so that it is now possible with the aid of a single sealing structure designed according to the invention to seal the gap between two machine parts moving linearly relative to each other in a manner which was not possible heretofore with the aid of comparable structures.

According to a preferred embodiment of the invention, the recess has a substantially trapezoidal cross-section. Such a groove defines the rest position of the stressing ring with high accuracy, and the increase of the surface pressure exerted upon the sealing edge on the low-pressure side, as well as the relieving effect on the sealing edge on the high-pressure side, can be determined by the angle of inclination of the groove flanks. It may be absolutely useful in this manner to select different angles of inclination for the two groove flanks.

According to a preferred embodiment of the invention, the space defined between the two sealing edges communicates with the bottom of the recess through at least one radial bore. Preferably, several such radial bores are provided which end at the bottom of the recess which is designed as an annular groove. Although these radial bores are always covered and, accordingly, closed by the stressing ring, the fluid which is pressurized at an excessive drag pressure is permitted to escape from the space between the two sealing edges through these radial bores when the drag pressure exceeds the counter pressure exerted by the stressing ring upon the end of the bore. The covering force exerted by the stressing ring and exceeding the fluid pressure gets the lower as the pressure of the fluid to be sealed off rises, because the before-mentioned displacement of the stressing ring occurring as the fluid pressure rises has the result that the contact pressure exerted by the stressing ring upon the flank of the annular groove on the low-pressure side rises, while the contact pressure exerted upon the flank of the annular groove on the high-pressure side is reduced so that when the pressure of the fluid in the space defined by the sealing edges exceeds a given amount the stressing ring is lifted off the flank of the groove on the high-pressure side whereby the excessively pressurized fluid is permitted to escape towards the high-pressure side so that no leakage occurs. It should be noted in this connection that the overpressure that must prevail in the space between the two sealing edges in order to permit the fluid to flow back to the high-pressure side through the radial bores gets lower, relatively, the higher the pressure of the fluid rises.

A particular advantage of the sealing ring structure according to the invention is seen in the fact that it is insensitive to relatively important tolerances because given the deformation to which the stressing ring is subjected when being restrained between the stressing ring and the bottom of the groove in the first machine part, due to the cross-section of the annular groove, the stressing rings used may consist of O rings having a relatively big cord thickness, which permits relatively important and, accordingly, even varying deformation if this should be required for balancing out existing tolerances.

While the stressing ring may consist simply of an O ring, the sealing ring may have the most diverse cross-sections for the purpose of adapting it optimally to the particular application. For example, it is absolutely possible to give the sealing ring an asymmetrical profile which is particularly convenient, for example, when the sealing ring structure is to be used as a wiper. In the case of such a preferred embodiment of the invention, the high-pressure side of the sealing ring is provided with a sealing edge formed by the line of intersection between two oppositely directed conical surfaces, while its low-pressure end is provided with an annular web forming a sealing edge. In this case, the line of intersection between the two conical surfaces forms a very sharp sealing edge on the high-pressure side which provides very efficient sealing against fluid under high pressure, in particular against hydraulic fluid, whereas given the larger axial extension of the annular web, the latter may serve as a wiper arranged on the low-pressure end for removing any dirt particles from the contact surface of the second machine part. At the same time, the annular web also forms a sealing edge for sealing off the high-pressure fluid. The effect of this sealing edge is particularly efficient when an angle opening towards the low-pressure side is defined between the circumferential surface of the web and the contact surface of the second machine part. Such an angle may in fact be obtained already when the sealing ring is deflected in the area between the two sealing edges by the pressure of the stressing ring so that the portions of the sealing ring located outside the sealing edges are lifted off the contact surface of the second machine part.

Other details and embodiments of the invention will appear from the following description of one embodiment of the sealing ring structure illustrated in the drawing. The features that can be derived from the following description and the drawing may be used in other embodiments of the invention either individually or in any desired combination.

BRIEF DESCRIPTION OF THE DRAWINGS

The FIGURE shows a cross sectional view of the sealing ring structure.

Referring now to the sealing ring structure illustrated in the drawing, a sealing ring 3 and a stressing ring 4 can be seen in the groove 1 of a first machine part 2. The first circumferential surface of the sealing ring 3, opposite the bottom of the groove 1, is in contact with the contact surface 5 of a second machine part 6. The first machine part 2 may, for example, be the end wall of a cylinder, while the second machine part 6 may be a rod passing through a bore in the cylinder wall 2 and performing a linear axial movement relative to the cylinder wall.

The sealing ring 3 arranged in the groove 1 of the first machine part 2 consists of a tough-elastic plastic material, for example on the basis of polytetrafluor ethylene or polyurethane. Its axial length is substantially equal to the width of the groove 1 so that it is received in the latter with a slight axial play. The circumferential surface of the sealing ring 3 facing the contact surface 5 of the second machine part 6 is provided with a first sealing edge 7 formed by two oppositely directed conical surfaces 8, 9, and with a second sealing edge 10 which is arranged at a certain distance from the first sealing edge 7 and formed by the edge of an annular web 11 provided at the other end of the sealing ring 3. The circumferential surface 12 of this web and the contact surface 5 of the second machine part 6 define between them an angle $\alpha$ of, preferably, approximately 5°.

The second circumferential surface of the sealing ring 3 facing the bottom 13 of the groove 1 is provided with a trapezoidal annular groove which is defined by inclined flanks 14, 15 and whose bottom 16 communicates with at least one, preferably a plurality of radial bores 17 distributed equally over the circumference of the sealing ring 3 and connecting the space 21 between the sealing edges 7, 10 of the sealing ring with the bottom 16 of the annular groove defined by the flanks 14, 15. The stressing ring 4, which consists of a rubber-elastic material, is fitted into the annular groove and is, thus, fixed in its axial position relative to the sealing ring 3. At the same time, the stressing ring 4 covers the ends of the radial bores 17 opening into the bottom of the groove 16. The stressing ring 4 consists of a simple O ring whose cord diameter, in the relaxed condition, it greater than the spacing between the bottom 16 of the annular groove and the bottom of the groove 13, so that the O ring is deformed in the manner illustrated in the drawing.

The sealing ring structure illustrated in the drawing combines a high-pressure seal with a dirt wiper. The high-pressure seal is formed by the sealing edge 7 between the two conical surfaces 8, 9, while the dirt wiper is formed by the web 11 whose width is selected in such a manner that it is capable of wiping off dirt particles from the second machine part which moves in the axial direction, i.e. from a rod, even if they adhere to it strongly. In addition, the sealing edge 10 of the web 11 also performs a sealing function.

It will be seen at once that the two edges of the stressing ring 4 arranged between the two sealing edges 7 and 10 are uniformly loaded and that the sealing ring may even be deflected to a certain degree in the area between these two sealing edges, whereby the angle $\alpha$ defined between the contact surface 5 of the second machine part 6 and the circumferential surface 12 of the web 11 is affected. Likewise, it will be seen that when being deformed in the axial direction, the stressing ring 4 formed by an O ring is capable of deflecting symmetrically to the flanks 14, 15 of the annular groove and of compensating in this manner even considerable tolerances with respect to the ring diameter, the diameter of the groove 1 in the first machine part 2 and also to the cross-section of the O ring.

The sealing ring structure illustrated in the drawing is always subjected to the action of the pressure fluid to be sealed off from the side of the sealing edge 7 formed by the conical surfaces. Accordingly, the pressure fluid urges the sealing ring 3 against the flank 18 of the groove 1 on the low-presure side, so that a gap is formed at the end face of the sealing ring 3 on the high-pressure side, through which the pressure fluid can enter the portion 20 of the groove 1 on the high-pressure side of the stressing ring 4. Consequently, the stressing ring 4 is subjected to an axial force which tends to urge the stressing ring slightly towards the low-pressure side, whereby the pressing force by which the stressing ring contracts the flank 15 on the low-pressure side of the annular groove in the sealing ring 13 increases and the pressing force exerted upon the opposite flank 14 decreases. When, accordingly, the pressurized fluid is permitted, due to reciprocating movements of the second machine part 6, to enter the space 21 formed between the sealing ring 3 and the second machine part 6 and delimited by the sealing edges 7, 10, past the sealing edge 7, and when the drag pressure building up in this space due to the dynamic processes exceeds the pressure prevailing on the high-pressure side of the sealing ring structure, then this pressure is limited by the fact that the fluid is permitted to escape from the space 21 through the radial bore 17 into the portion 20 of the groove 1 and, accordingly, to the high-pressure side of the sealing ring structure, by lifting the stressing ring from the flank 14 of the trapezoidal groove of the sealing ring 3. The fact that the stressing ring 4 is subjected to pressure from one side only, and the higher contact pressure at the flank 15 on the low-pressure side resulting therefrom ensure that no liquid is permitted to escape to the low-pressure side but that the non-return valve formed by the stressing ring in combination with the groove in the sealing ring will always open exclusively to the high-pressure side.

It should be noted in this connection that when the sealing ring structure according to the invention is used for sealing purposes the pressure fluid carried into the space 21 defined by the sealing edges, and the pressure building up in consequence thereof, lead to the result that the sealing edges 7 and 10 are unloaded and that this condition is even maintained when the pressure difference between the two sides separated by the sealing ring structure does no longer exist, because the pressure space which is sealed off by the stressing ring 4 will be opened only when the pressure prevailing inside the space 21 exceeds the fluid pressure by an amount defined by the pressing force of the stressing ring 4. Further, the sealing ring structure illustrated by way of example would be effective also without the radial bores 17, because due to the described displacement of the stressing ring the unloading effect on the sealing edges described above is much more important at the sealing edge on the high-pressure side than at the sealing edge on the low-pressure side so that the lower pressing force exerted upon the sealing edge on the high-pressure side will cause the fluid contained in the space 21, which is subjected to a high drag pressure, to lift at first the sealing edge 7 on the high-pressure side and, accordingly, to flow back to the high-pressure side before the sealing edge 10 on the low-pressure side can be lifted, whereby leakage would occur.

I claim as my invention:

1. Sealing ring structure for sealing the gap between two concentric machine parts which are arranged for linear movement relative to each other, the first machine part being provided with a groove having a bottom and axially spaced and opposed sides connected by said bottom while the second machine part comprises a plain contact surface arranged opposite the said groove, the said sealing ring structure comprising a sealing ring made of a tough-elastic plastic material fitted into the groove, said sealing ring having a high pressure end and a low pressure end, and having first and second circumferential surfaces disposed between said ends, said first circumferential surface facing said contact surface and said second circumferential surface facing the bottom of the groove, and being provided with sealing edges which are arranged spaced from said ends on said first circumferential surface facing the said contact surface and by which the sealing ring bears against the contact surface of the second machine part, and being further provided with an annular recess arranged in said second circumferential surface facing the bottom of the groove, the sealing ring structure comprising further a stressing ring made of a rubber-elastic material arranged between the said sealing ring and the bottom of the groove, in the recess provided in the second circumferential surface of the sealing ring, the axial extension of the said stressing ring between the axially spaced and opposed sides being smaller than that of the sealing ring, the improvement wherein the said recess is provided in the area between the two sealing edges of the said sealing ring, and the dimensions of said recess are selected so that its width decreases as its depth rises, and that the said stressing ring engaging said recess is free to shift towards the low-pressure end of the sealing ring and the sealing ring includes at least one radial bore communicating between the space defined between the two sealing edges and the bottom of the said recess.

2. Sealing ring structure for sealing the gap between two concentric machine parts which are arranged for linear movement relative to each other, the first machine part being provided with a groove having a bottom and axially spaced and opposed sides connected by said bottom while the second machine part comprises a plain contact surface arranged opposite the said groove, the said sealing ring structure comprising a sealing ring made of a tough-elastic plastic material fitted into the groove, said sealing ring having a high pressure end and a low pressure end, and having first and second circumferential surfaces disposed between said ends, said first circumferential surface facing said contact surface and said second circumferential surface facing the bottom of the groove, and being provided with sealing edges which are arranged from said ends on said first circumferential surface facing the said contact surface and by which the sealing ring bears against the contact surface of the second machine part, and being further provided with an annular recess arranged in said second circumferential surface facing the bottom of the groove, the sealing ring structure comprising further a stressing ring made of a rubber-elastic material arranged between the said sealing ring and the bottom of the groove, in the recess provided in the second circumferential surface of the sealing ring, the axial extension of the said stressing ring between the axially spaced and oppposed sides being smaller than that of the sealing ring, the improvement wherein the said recess is provided in the area between the two sealing edges of the said sealing ring, and the dimensions of said recess are selected so that its width decreases as its depth rises, and that the said stressing ring engaging said recess is free to shift towards the low-pressure end of the sealing ring and the said recess has a substantially trapezoidal cross-section, and the sealing ring includes at least one radial bore communicating between the space defined between the two sealing edges and the bottom of the said recess.

3. Sealing ring structure for sealing the gap between two concentric machine parts which are arranged for linear movement relative to each other, the first machine part being provided with a groove having a bottom and axially spaced and opposed sides connected by said bottom while the second machine part comprises a plain contact surface arranged opposite the said groove, the said sealing ring structure comprising a sealing ring made of a tough-elastic plastic material fitted into the groove, said sealing ring having a high pressure end and a low pressure end, and having first and second circumferential surfaces disposed between said ends, said first circumferential surface facing said contact surface and said second circumferential surface facing the bottom of the groove, and being provided with sealing edges which are arranged spaced from said ends on said first circumferential surface facing the said contact surface and by which the sealing ring bears against the contact surface of the second machine part, and being further provided with an annular recess arranged in said second circumferential surface the bottom of the groove, the sealing ring structure comprising further a stressing ring made of a rubber-elastic material arranged between the said sealing ring and the bottom of the groove, in the recess provided in the second circumferential surface of the sealing ring, the axial extension of the said stressing ring between the axially spaced and opposed sides being smaller than that of the sealing ring, the improvement wherein the said recess is provided in the area between the two sealing edges of the said sealing ring, and the dimensions of said recess are selected so that its width decreases as its depth rises, and that the said stressing ring engaging said recess is free to shift towards the low-pressure end of the sealing ring and the high-pressure end of the said sealing ring is provided with a sealing edge formed by the line of intersection between two oppositely directed conical surfaces, and the low-pressure end is provided with an annular web forming a sealing edge and the sealing ring includes at least one radial bore communicating between the space defined by the two sealing edges and the bottom of the said recess.

4. Sealing ring structure according to claim 3 in which the circumferential surface of the said web and the contact surface of the said second machine part define between them a small angle (a) opening towards the end of the said sealing ring to which the web is closer.

* * * * *